United States Patent [19]
Billard et al.

[11] Patent Number: 4,479,417
[45] Date of Patent: Oct. 30, 1984

[54] MISSILE LAUNCHER MODULE IN PARTICULAR FOR AIRCRAFT, WITH GENERAL REVERSIBLE SAFETY DEVICE

[75] Inventors: Alain A. Billard, Muret; André R. Santalucia, Leguevin; Roland C. Encoyand, Muret, all of France

[73] Assignee: Societe E. LaCroix, France

[21] Appl. No.: 383,774

[22] Filed: Jun. 1, 1982

[30] Foreign Application Priority Data

Jun. 3, 1981 [FR] France .................. 81 10975

[51] Int. Cl.³ .............................................. F41F 5/02
[52] U.S. Cl. .................................. 89/1.5 D; 89/1.5 E; 89/1.5 F; 102/200
[58] Field of Search ............... 89/1.5 R, 1.5 D, 1.5 E, 89/1.5 F; 102/206, 222, 254, 264, 200

[56] References Cited

U.S. PATENT DOCUMENTS

| | | | |
|---|---|---|---|
| 3,430,533 | 3/1969 | Kifor et al. | 89/1.5 R |
| 4,026,188 | 5/1977 | Woodruff et al. | 89/1.5 R |
| 4,129,271 | 12/1978 | Hasquenoph et al. | 89/1.5 C |
| 4,164,887 | 8/1979 | Ouellette | 102/357 |
| 4,348,936 | 9/1982 | Fulchiron et al. | 89/1.5 D |

FOREIGN PATENT DOCUMENTS 20225 12/1980 European Pat. Off. .
2036520 12/1970 France .
2082375 12/1971 France .

Primary Examiner—Richard E. Schafer
Assistant Examiner—Maureen T. Ryan
Attorney, Agent, or Firm—McCormick, Paulding & Huber

[57] ABSTRACT

A standard launcher module for various missiles, in particular flares, comprises a flat wall forming a base, provided with male engagement members. In the position engaged on the support incorporated in the aircraft, a connector is active. Provided in a central groove is a series of electrical initiators connected selectively to the connector and located opposite counterpart relay channels which lead respectively to the useful charges. A sliding bar located in the groove has orifices, located according to the working geometry of the initiators. Finally, a motor connected to the connector allows the movement of the bar between a safety position and an armed position.

6 Claims, 7 Drawing Figures

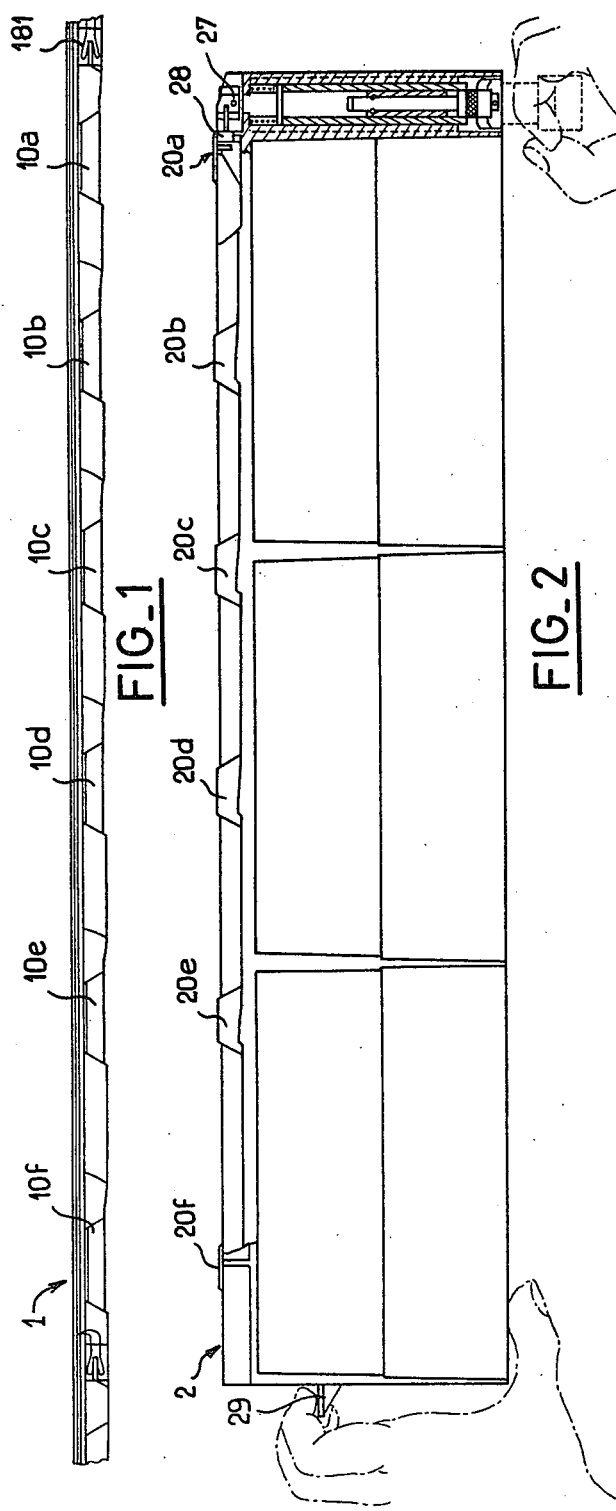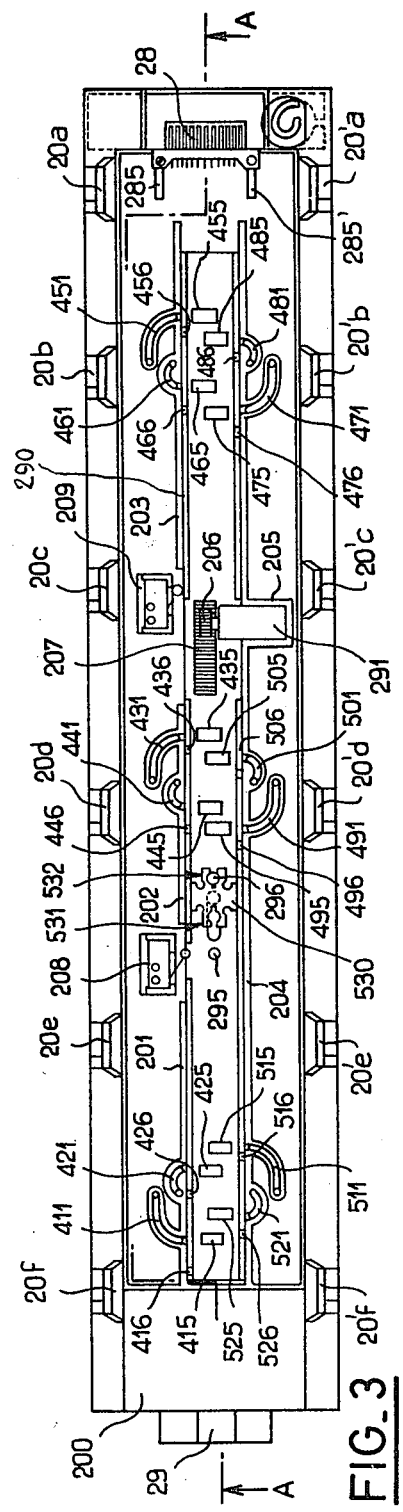

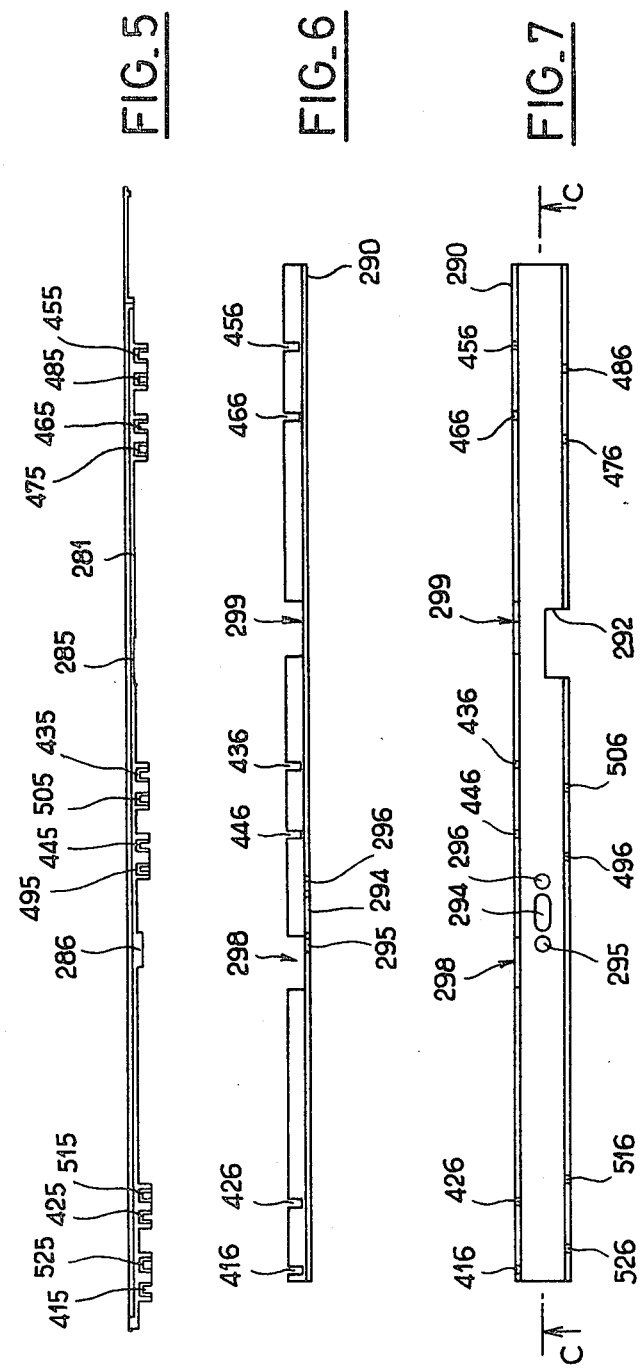

MISSILE LAUNCHER MODULE IN PARTICULAR FOR AIRCRAFT, WITH GENERAL REVERSIBLE SAFETY DEVICE

The invention relates to missile and/or countermeasure launcher equipment carried on board, in particular for aircraft.

In copending U.S. Patent Application Ser. No. 384,097 filed on June 1, 1982, and entitled "Securing Apparatus for Modules Carried on Aircraft, in Particular for Flare Launching Modules", a particular structure of the missile launching module has been proposed. As regards the present invention, the important aspect of these modules is that they comprise a flat wall forming a base, provided with male engagement members, able to cooperate with counterpart female engagement members on a support rod to be fixed to the aircraft. In the engaged position, an electrical connector facilitates a connection between the module carried on board and the aircraft.

The purpose of such modules is to contain a considerable number of active charges, for example the flares described in the aforementioned patent application. The difficulty is thus that it is necessary to provide a particularly elaborate safety device. For their part, it is the purpose of the modules in question to provide the aircraft with a considerable number of types of countermeasures or different missiles, which on the other hand may equally be fixed to the same type of support rod. Under these conditions, the production of the safety device necessary causes real problems: it is necessary that this safety device be carried wholly by the module, that it be reversible, since it must be able to return to its position when a module which has not been used is removed from its support on the aircraft and yet despite everything it remains perfectly effective.

The present invention intends to provide a suitable solution to this problem.

According to one aspect of the present invention, the flat wall which forms the base of the module comprises a central groove, which houses a series of electrical initiators selectively connected to the aforesaid electrical connector and located opposite counterpart fire-transmission channels implanted in the flat bottom wall, these channels terminating respectively at the various useful charges, such as flares, contained in the module. Furthermore, the groove comprises a sliding bar, comprising orifices located in this bar according to the working geometry of the initiators. Finally, an electric motor is provided which is connected to the connector, in order to ensure the movement of the bar between a safety position and an armed position in which the orifices are opposite initiators.

In a preferred embodiment, the bar is an aluminium sectional member of general U shape. A particularly effective and reversible safety device is thus obtained, with regard to a module equipped with flare charges.

Very advantageously, the module also comprises two micro-switches, connected to the connector, in order to detect the safety position and the armed position.

In practice, it is desirable that the micro-switches cooperate with notches provided laterally in the bar and which are offset with respect to the micro-switches, in order that one of the switches without fail represents the safety position and the other the armed position.

In a particular embodiment, a device forming clips is provided, which is capable of keeping the bar in the safety position or armed position with a considerable retaining force.

According to another aspect of the present invention, the electric motor comprises a cobalt/samarium magnet, which with low bulk provides a high starting torque and makes it possible to overcome the high retaining force applied by the aforesaid device forming clips.

Fully controlled and monitored electrically, the safety device according to the present invention resolves the aforesaid problem simply and completely.

Further features and advantages of the invention will become apparent on reading the ensuing detailed description, made with reference to the accompanying drawings and given in order to illustrate a preferred embodiment of the invention in a non-limiting manner and in which:

FIG. 1 is a sectional view of a support rod used for fixing a missile launcher module to an aircraft;

FIG. 2 is a diagrammatic sectional view of a missile launcher module of this type;

FIG. 3 is a plan view of the same module, showing the devices according to the present invention;

FIG. 4 is a bottom view of the cover attached to the module of FIG. 3;

FIG. 5 is a sectional view of the same cover;

FIG. 6 is a sectional view of the safety bar incorporated in the module of FIG. 3 and FIG. 7 is a top plan view of the same safety bar.

In FIG. 1, the support rod incorporated in the aircraft is designated by the reference numeral 1 and comprises female engagement members identified by the numerals 10a to 10f. Other details of these engagement members are given in the above mentioned U.S. Pat. Application Ser. No. 384,097. The reference numeral 181 designates an electrical connector input.

In FIG. 2, the general reference 2 designates a missile launcher module. This module comprises male engagement member 20a to 20f, which are in this case in the form of dovetails like the counterpart members 10a to 10f of FIG. 1. A gripping handle 29 is also shown, as well as a device 27 which is able to ensure a relative translation between the support rod 1 and the module 2, in order to ensure locking of the male and female members by their dovetails. Finally, a connector 28 is shown, which is incorporated in the missile launcher module in its upper part and is able to cooperate with the connector member 181 of the support rod. Other descriptive passages relating to the general structure of this module may be found in the aforementioned patent application.

Reference will now be made essentially to FIG. 3 and to the following figures. In FIG. 3, located in the upper part of the module 2 is a central groove, defined on one side by a rib 204 and on the other side by three ribs 201, 202 and 203. Supported on these ribs are fire-transmission channels, namely 411 and 421 for the rib 201, 431 and 441 for the rib 202, 451 and 461 for the rib 203. On the other side, the rib 204, which is continuous except for a recess at 205, receives three pairs of relay channels, respectively 471 and 481, 491 and 501 as well as 511 and 521. These channels are open towards the inside of the groove and located in facing relationship thereto are respective electrical initiators, 415, 425, 435, 445, 455, 465, 475, 485, 495, 505, 515, 525 . Thus an electrical initiator 425 is located opposite the entrance to the channel 421 and so on. The electrical initiators 415, 425 and so on are naturally connected to the connector device 28.

Mounted to slide in the groove which has been described is a bar, designated by the general reference 290 and illustrated in FIGS. 6 and 7. This bar is constituted generally by an aluminium sectional member of U-shaped cross-section. Laterally, i.e. on the sides of the U, the bar comprises orifices located according to the working geometry of the initiators 415, 425 etc. These orifices bear the same reference numerals 416, 426, 436, 446, 456, 466, 476, 486, 496, 506, 516, 526. The bar 290 also comprises a recess at 292, in the vicinity of the recess 291 in the groove 204. On the other side, it also comprises two recesses 298 and 299. Finally, the bottom of the cross-section of the bar comprises an elongated cell-like hole 294, and on either side and on the same axis, holes 295 and 296, which support studs designated by the same reference numeral and fixed to the bar projecting towards the inside of the latter.

As shown in FIG. 3, the upper wall of the module is connected, by an attachment which passes through the hole 294, to a clipping device 530, comprising a resilient fork 531 on one side, which is able to cooperate with the stud 295 and a resilient fork 532 on the other side, which is able to cooperate with the stud 296. Preferably, the device 530 also comprises lateral extensions which rub against the side walls of the U constituting the bar 290, in order to define the angular position of the part 530 clearly.

In FIG. 3, an electric motor 291 is shown in the recess 205, which motor can be controlled by way of the connector 28 and is provided with one or more cobalt-/samarium magnets, in order to have a high starting torque. This magnet cooperates by a mechanical connection with high reduction, such as a gear train, with a rack on the bar 290, in order to allow a displacement of the latter between a safety position (position illustrated) and an armed position.

Finally, also connected to the connector 28 are two micro-switches 208 and 209 comprising a roller, which cooperate with the aforementioned notches 298 and 299, on the lateral part of the bar 290. The assembly is such that the "safety" micro-switch is open solely in the safety position, whereas the "armed" micro-switch is open solely in the armed position. One thus obtains a certain knowledge, in the central control unit located on the aircraft, as regards the position of the safety device. These contacts also make it possible to choose the polarity of the drive for the motor 291 and to stop the drive when locking is obtained.

As shown in FIG. 3, in the safety position, the orifices in the bar 290 are offset with respect to a beginning of the channels 411,421 and so on. Thus, ignition is not possible upon initiation of the electrical initiators. On the contrary, when the bar is moved towards the right and the stud 295 is engaged in the fork 531, only one micro-switch 208 will be excited, 209 coming into an open circuit and the initiators will thus be able to transmit fire to the channels arranged in facing relationship, through the orifices which will have come into alignment between each initiator and its channel.

Reference will now be made to FIGS. 4 and 5, which illustrate the arrangement of the initiators more precisely. In fact, the latter are illustrated in FIG. 3, but should not be visible in the latter, since the cover 280 is assumed to be removed and the initiators are supported by the cover. FIG. 4 shows the geometric arrangement of the initiators as sketched in FIG. 3. FIG. 4 also shows a projection 286, which bears on the device 530, in order to keep it in position, in particular in opposition to vibrations occurring on the aircraft. The reference numeral 285 also designates a recess located opposite the recess 205, in order to facilitate easier housing of the motor 291.

It will be noted that the safety device according to the invention is particularly advantageous, since it is effective from the manufacture of the modules until the arming of the latter, which advantageously takes place after take-off. This safety device thus involves the stages of transportation, storage and loading onto the aircraft.

Moreover, if the charge is not fired, before landing, it is possible to return to a safety position.

In other words, during the various stages of the life of the ammunition, the invention makes it possible to take precautions against the main danger constituted by the sensitivity of the electro-pyrotechnic devices to electromagnetic radiation (close radio or radar emissions, lightning or an electromagnetic pulse due to a nuclear flash).

In fact, whatever the precautions taken as regards screening and thresholds of insensitivity of the initiators used, the spontaneous actuation of an initiator is never absolutely excluded.

Naturally, the present invention is not limited by the embodiment described and extends to any variation within its scope.

We claim:

1. A missile launcher module carried by an aircraft comprising: a flat wall forming a base provided with male engagement members which cooperate with counterpart female engagement members of a support rod fixed to the aircraft and an electrical connector establishing a connection between the module and the carrying aircraft in the engaged position of the module, said flat wall forming the base of the module defining a central groove, a series of electrical initiators housed within the groove and selectively connected to said electrical connector, the initiators being located opposite counterpart fire-transmission channels formed in the flat base wall in order to terminate respectively at useful charges contained in the module, the central groove also supporting a slide bar having orifices located according to the working geometry of the initiators, and an electrical motor electrically connected to the connector for energization and mechanically connected to the base in order to ensure movement of the bar between a safe position and an armed position in which the orifices are opposite the initiators.

2. Module according to claim 1, characterised by the fact that the bar is an aluminium sectional member of general/U-shape.

3. Module according to one of claims 1 and 2, characterised by the fact that the module also comprise two micro-contacts connected to the connector, in order to detect the safety position and the armed position.

4. Module according to claim 1, characterised by the fact that a device forming clips is provided, which is capable of keeping the bar in a safety position or armed position with a high retaining force.

5. Module according to claim 1, characterised by the fact that the electric motor comprises a cobalt-/samarium magnet.

6. Module according to claim 3, characterised by the fact that the micro-contacts cooperate with notches provided laterally in the bar and offset overall with respect to the micro-contacts by the distance by which the bar moves.

* * * * *